US011332025B2

(12) United States Patent
Parimi et al.

(10) Patent No.: US 11,332,025 B2
(45) Date of Patent: May 17, 2022

(54) MULTI-DIRECTIONAL WIRELESS CHARGING OF VEHICLES AND ROBOTS

(71) Applicant: The Research Foundation for SUNY, Albany, NY (US)

(72) Inventors: Patanjali V. Parimi, Liverpool, NY (US); M Raihan Hossain, New York, NY (US)

(73) Assignee: The Research Foundation for SUNY, Albany, NY (US)

( * ) Notice: Subject to any disclaimer, the term of this patent is extended or adjusted under 35 U.S.C. 154(b) by 446 days.

(21) Appl. No.: 16/379,751

(22) Filed: Apr. 9, 2019

(65) Prior Publication Data

US 2019/0308514 A1  Oct. 10, 2019

Related U.S. Application Data

(60) Provisional application No. 62/655,099, filed on Apr. 9, 2018.

(51) Int. Cl.
*H02J 7/00* (2006.01)
*B60L 53/12* (2019.01)
*H02J 50/12* (2016.01)
*H02J 7/02* (2016.01)
*B64C 39/02* (2006.01)
*H02J 50/40* (2016.01)

(52) U.S. Cl.
CPC .......... *B60L 53/12* (2019.02); *B64C 39/024* (2013.01); *H02J 7/025* (2013.01); *H02J 50/12* (2016.02); *H02J 50/40* (2016.02); *B60L 2200/10* (2013.01); *B64C 2201/042* (2013.01)

(58) Field of Classification Search
None
See application file for complete search history.

(56) References Cited

U.S. PATENT DOCUMENTS

| | | | | |
|---|---|---|---|---|
| 10,343,536 | B2 * | 7/2019 | Moghe | B60L 53/122 |
| 10,688,874 | B2 * | 6/2020 | Kwasnick | H02J 50/90 |
| 10,967,752 | B2 * | 4/2021 | Liu | B60L 53/126 |
| 2012/0025761 | A1 * | 2/2012 | Takada | H02J 50/12 320/108 |
| 2015/0042168 | A1 * | 2/2015 | Widmer | B60L 53/305 307/104 |
| 2015/0170833 | A1 * | 6/2015 | Widmer | H02J 50/80 307/104 |
| 2016/0297305 | A1 * | 10/2016 | Ichikawa | B60L 11/182 |

* cited by examiner

*Primary Examiner* — Arun C Williams
(74) *Attorney, Agent, or Firm* — Austin Winter; Michael Krenicky; Steven A. Wood, Jr.

(57) ABSTRACT

The present invention comprises a wireless charging station, configured to charge remote controlled and autonomous vehicles and robots, including one or more charging pods, wherein each pod has at least two panels and at least two wireless power transmitters (WPTs) affixed to at least two of the panels, wherein the WPTs are configured to deliver power wirelessly to at least two wireless power receivers (WPRs), associated with a remote controlled vehicle, an autonomous unmanned vehicle or a robot. The present invention further comprises a method to charge a robot or vehicle at a distance from a wireless power transmitter (WPT), the method comprising: detecting a first WPR located a first distance from a first WPT and a second WPR located a second distance from a second WPT, and transmitting power from the WPTs to the WPRs to charge the robot or vehicle.

20 Claims, 12 Drawing Sheets

Our wireless power transfer system achieves
higher power efficiency at further range Power and efficiency can be increased by increasing size and number of coils

MULTI-DIRECTIONAL WIRELESS CHARGING OF VEHICLES AND ROBOTS

CROSS-REFERENCE TO RELATED APPLICATIONS

This application claims priority to U.S. Provisional Application No. 62/655,099, filed Apr. 9, 2018 and entitled MULTI-DIRECTIONAL WIRELESS CHARGING OF VEHICLES AND ROBOTS. This application is also a continuation-in-part of U.S. patent application Ser. No. 15/701,112, filed Sep. 11, 2017 and entitled WIRELESS POWER TRANSFER SYSTEMS AND COMPONENTS THEREOF, which claims priority to U.S. Provisional Patent Application No. 62/393,141, filed Sep. 12, 2016, also entitled WIRELESS POWER TRANSFER SYSTEMS AND COMPONENTS THEREOF. All of these related applications are herein incorporated by reference in entirety

BACKGROUND

Field

One or more aspects of the present invention relate to wireless power transfer systems and components thereof. More particularly, the present disclosure is directed to use of wireless power transfer systems to achieve multi-directional charging of a robot or a vehicle (e.g., remote controlled or autonomous unmanned vehicles) having multiple wireless power receivers integrated or attached thereto. Specifically, the present invention comprises a modular charging station configuration operable to enable multi-directional charging of one or more robots and vehicles.

Description of Related Art

The demand for increased up-time or mission time of drones and other autonomous and remote piloted vehicles is driving innovation in battery technologies, with a strong need to keep vehicle weight to a minimum for aerial vehicles. This same demand is also driving innovation in wireless charging and wireless power transfer technologies.

Wireless power transfer, wireless power transmission, wireless energy transmission, or electromagnetic power transfer is the transmission of electrical energy without wires as a physical link. Wireless power transmission technologies use time-varying electric, magnetic, or electromagnetic fields. Wireless power transfer is useful to power electrical devices where interconnecting wires are inconvenient, hazardous, or are not possible.

Wireless power techniques mainly fall into two categories, non-radiative and radiative. In near field or non-radiative techniques, power is transferred over short distances by magnetic fields using inductive coupling between coils of wire, or by electric fields using capacitive coupling between metal electrodes. Inductive coupling is the most widely used wireless technology; its applications include charging handheld devices like phones and electric toothbrushes, RFID tags, and chargers for implantable medical devices like artificial cardiac pacemakers, or electric vehicles.

In far-field or radiative techniques, also called power beaming, power is transferred by beams of electromagnetic radiation, like microwaves or laser beams. These techniques can transport energy longer distances but must be aimed at the receiver.

Wireless power transfer is a generic term for a number of different technologies for transmitting energy by means of electromagnetic fields. The technologies, listed in the table below, differ in the distance over which they can transfer power efficiently, whether the transmitter must be aimed (directed) at the receiver, and in the type of electromagnetic energy they use: time varying electric fields, magnetic fields, radio waves, microwaves, infrared or visible light waves.

In general a wireless power system consists of a "transmitter" connected to a source of power such as a mains power line, which converts the power to a time-varying electromagnetic field, and one or more "receiver" devices which receive the power and convert it back to DC or AC electric current which is used by an electrical load. At the transmitter the input power is converted to an oscillating electromagnetic field by some type of "antenna" device. The word "antenna" is used loosely here; it may be a coil of wire which generates a magnetic field, a metal plate which generates an electric field, an antenna which radiates radio waves, or a laser which generates light. A similar antenna or coupling device at the receiver converts the oscillating fields to an electric current. An important parameter that determines the type of waves is the frequency, which determines the wavelength.

Wireless power uses the same fields and waves as wireless communication devices like radio, another familiar technology that involves electrical energy transmitted without wires by electromagnetic fields, used in cellphones, radio and television broadcasting, and WiFi. In radio communication the goal is the transmission of information, so the amount of power reaching the receiver is not so important, as long as it is sufficient that the information can be received intelligibly.

In wireless communication technologies only tiny amounts of power reach the receiver. In contrast, with wireless power the amount of energy received is the important thing, so the efficiency (fraction of transmitted energy that is received) is the more significant parameter. For this reason, wireless power technologies are likely to be more limited by distance than wireless communication technologies.

TABLE I illustrates the basic different wireless power transmission technologies:

| Technology | Range | Directivity | Frequency | Antenna Devices | Current and/or possible future application |
|---|---|---|---|---|---|
| Inductive coupling | Short | Low | Hz-MHz | Wire coils | Electric tooth brush and razor battery charging, induction stovetops and industrial heaters. |
| Resonant inductive | Mid- | Low | kHz-GHz | Tune wire coils, lumped element | Charging protable devices (Qi), biomedical implants, |

TABLE I-continued illustrates the basic different wireless power transmission technologies:

| Technology | Range | Directivity | Frequency | Antenna Devices | Current and/or possible future application |
|---|---|---|---|---|---|
| coupling | | | | resonators | electric vehicles, powering buses, trains, MAGLEV, RFID, smartcard. |
| Capacitve coupling | Short | Low | kHz-MHz | Metal plate electrodes | Charging portable devices, power routing in large-scale integrated circuits, Smartcards. |
| Magneto-dynamic coupling | Short | N.A. | Hz | Rotating magnets | Charging electric vehicls, buses, biomedical implants. |
| Microwaves | Long | High | GHz | Parabolic dishes, phased arrays, rectennas | Solar power satellite, powering drone aircraft, charging wireless devices. |
| Light waves | Long | High | ≥THz | Lasers photocells, lenses | Charging portable devices, powering drone aircraft, powering space elevator climbers. |

The Federal Communications Commission approved the first wireless transmission charging system in December 2017. San Jose-based startup, Energous, received the FCC certification for its power-at-a-distance wireless charging product, WattUp, a mid-range transmitter. The transmitter converts electricity into radio frequencies, then beams the energy to nearby devices outfitted with a corresponding receiver.

This differs from the resonant induction method that the Pi wireless charging system relies upon and offers a greater range than the Belkin and Mophie chargers that require physical contact with the device. The Pi device is shaped like a lampshade, or a cone with its tip cut off. It uses resonant induction, which is the same tech that Qi uses, but with a special beam forming algorithm that shapes and directs magnetic fields around the device. That means that instead of needing to put your phone directly on it, you can just put your phone next to it.

Near-field or nonradiative region—This means the area within about 1 wavelength (λ) of the antenna. In this region the oscillating electric and magnetic fields are separate and power can be transferred via electric fields by capacitive coupling (electrostatic induction) between metal electrodes, or via magnetic fields by inductive coupling (electromagnetic induction) between coils of wire. These fields are not radiative, meaning the energy stays within a short distance of the transmitter.

If there is no receiving device or absorbing material within their limited range to "couple" to, no power leaves the transmitter. The range of these fields is short, and depends on the size and shape of the "antenna" devices, which are usually coils of wire. The fields, and thus the power transmitted, decrease exponentially with distance, so if the distance between the two "antennas" $D_{range}$ is much larger than the diameter of the "antennas" $D_{ant}$ very little power will be received. Therefore, these techniques cannot be used for long range power transmission.

Resonance, such as resonant inductive coupling, can increase the coupling between the antennas greatly, allowing efficient transmission at somewhat greater distances, although the fields still decrease exponentially. Therefore, the range of near-field devices is conventionally divided into two categories:

Short range—up to about one antenna diameter: $D_{range} \leq D_{ant}$. This is the range over which ordinary nonresonant capacitive or inductive coupling can transfer practical amounts of power.

Mid-range—up to 10 times the antenna diameter: $D_{range} \leq 10\ D_{ant}$. This is the range over which resonant capacitive or inductive coupling can transfer practical amounts of power.

In the case of electromagnetic radiation closer to the visible region of the spectrum (tens of micrometers to tens of nanometers), power can be transmitted by converting electricity into a laser beam that is then pointed at a photovoltaic cell. This mechanism is generally known as "power beaming" because the power is beamed at a receiver that can convert it to electrical energy. At the receiver, special photovoltaic laser power converters which are optimized for monochromatic light conversion are applied.

Several solutions currently exist for different types of wireless charging solutions for drones, aerial robots and other vehicles. Companies such as Wibotic Ossia, Solace Power, SkySense, Humavox and H3 Dynamics operate in this or adjacent spaces. For instance, Wibotic's PowerPad is a wireless magnetic resonance-based charging pad for both remote piloted and autonomous unmanned aerial vehicles (UAVs) and drones.

Solace Power provides charging solutions for drones and other aircrafts using capacitive resonance-based technology. Solace Power is capable of beaming power to an air vehicle hovering over a capacitive station, thus increasing the vehicles flight time.

SkySense offers indoor and outdoor charging pads, as well as an outdoor charging hangar for harsher environments.

H3 Dynamics also offers an automated wireless charging pad and storage station called the Dronebox, which can be left unattended for months at a time due to integrated solar panels.

Humavox's ETERNA Platform is designed to turn any potential landing surface into a charging station. The ETERNA Platform is used for search and rescue as well as law enforcement. With Humavox's ETERNA platform, drones could be charged in a drawer or shelf attached to a fire truck, with drones recharging in between flights.

Other companies have developed wireless charging solutions by beaming power to drones in flight. Companies that offer solution to drone batteries, but do not use wireless charging include Powerlight Technologies, CyPhy, and Airobotics. Powerlight Technologies, previously known as LaserMotive, sends powers using fiber optic cables. CyPhy offers a drone with an integrated tethered charger integrated. Airobotics offers an automated remote battery swapping station for drones.

Witricity in collaboration with Daihen Corp commercialized wireless power transfer system for automatic guided vehicles using wireless power over distance technology. In particular, Daihen's D-Broad autonomous charging technology shows the capability of WiTricity's magnetic resonance technology to facilitate factory automation. The 5 kilogram power transmitting unit is rated for input power of 4 KW and rated input voltage of AC 200 V.

In these type of chargers, a transmitter circuit is embedded in a drone landing pad or robotic docking station whose shape, size, and weight can be customizable for specific applications. Upon approaching, a drone's presence is detected by the system. A receiver coil mounted on (or embedded in) the drone then begins to receive power.

Depending on the distance between the transmitter pod and the receiver on the drone, a software can "adaptively tune" the resonance of the transmit and receive coils, optimizing their frequency to account for changing distances and orientations in between. One of the issues with these existing technologies is charging at the bottom of the air vehicle would compromise the mission capability.

Further, automatic guided vehicles (AGVs) move through factory floors on their own using on-board navigation as opposed to fixed underground wire guidance, but finding a way to work charging into the robot's route can be a solution to a significant pain point. Instead of requiring charging connectors and cables, the Daihen system designed to manage a factory robot that can charge on the go. With this method, neither docking stations nor power rails need to be installed We have previously developed a tunable highly efficient planar wireless power transfer system that allows for charging on both sides of the transmitter at greater distances than commercially available devices (See, USPTO patent application Ser. No. 15/701,112 entitled "Wireless Power Transfer Systems and Components Thereof", which is herein incorporated by reference in entirety). The power transfer efficiency is increased by using coupled magnetic resonance and two asynchronous coils in the design of the transmitter and receiver. The wireless charger is based on coupled magnetic resonance and is capable of powering devices at distances of a few centimeters to 1 meter, with a wide power range of 1 watt to a few kilowatts.

Compared to other magnetic resonance-based chargers, our patent pending technology demonstrates less degradation in power efficiency with range, the ability to charge multiple devices on both sides of the transmitter and allows for thin flexible receivers that can be mounted on planar, singly and doubly curved surfaces.

In the case of two receivers and for the transmitter and receivers of diameter 10.8 cm, our demonstrated results show a stable 95% and 86.5% efficiency at 5 cm and 10 cm distances, respectively. By increasing the diameter of the transmitter devices can be charged up to 100 cm. Further, the efficiency is significantly improved by tuning the transmitter and receiver at each transfer distance in real time.

The demand for increased up-time or mission time of drones and other autonomous and remote piloted vehicles, with a strong need to minimize vehicle weight has not been solved by the conventional and commercially available wireless power transfer and wireless charging technologies. Consequently, there remains a need for improved wireless power transfer and wireless charging systems that can address the technical challenges that constrain this field, including the challenges of limited air time or up-time, speed of recharge, and the need for seamless performance in drone and autonomous vehicle mission operations.

SUMMARY

The following summary presents a simplified synopsis of the invention in order to provide a basic understanding of some aspects of the invention. This summary is not intended to identify all critical elements or delineate the entire scope of the invention nor is it intended to set forth all essential features or limit in any way the scope of the claimed subject matter. Its sole purpose is to present some concepts of the invention in a simplified form as a prelude to the more detailed description that is presented later.

Reference throughout this specification to "one embodiment" or "an embodiment" means that a particular feature, structure, or characteristic described in connection with an embodiment is included in at least one embodiment of claimed subject matter. Thus, appearances of phrases such as "in one embodiment" or "an embodiment" in various places throughout this specification are not necessarily all referring to the same embodiment. Furthermore, particular features, structures, or characteristics may be combined in one or more embodiments.

The present invention comprises a multi-directional wireless charging station, configured to deliver wireless power to remote controlled and autonomous unmanned vehicles and robots, composed of 1) one or more charging pods, wherein each pod has at least two panels, each panel having a first surface facing, at least in part, one or more of an opening and a surface of another panel, and 2) at least two wireless power transmitters (WPTs) affixed to at least two of the panels, wherein the WPTs are configured to wirelessly deliver power to at least two wireless power receivers (WPRs) associated with one of a remote controlled vehicle, an autonomous unmanned vehicle and a robot.

The present invention further comprises a method to charge a robot or vehicle at a distance from a wireless power transmitter (WPT), the method comprising: 1) detecting, on the robot or vehicle, one of a first wireless power receiver (WPR) located a first distance from a first WPT and a second WPR located a second distance from a second WPT, and 2) transmitting power from the WPTs to the WPRs to charge the robot or vehicle.

BRIEF DESCRIPTION OF THE DRAWINGS

Non-limiting and non-exhaustive features will be described with reference to the following figures, wherein like reference numerals refer to like parts throughout the various figures. The figures below were not intended to be drawn to any precise scale with respect to size, angular relationship, or relative position.

DETAILED DESCRIPTION

Figure 1:
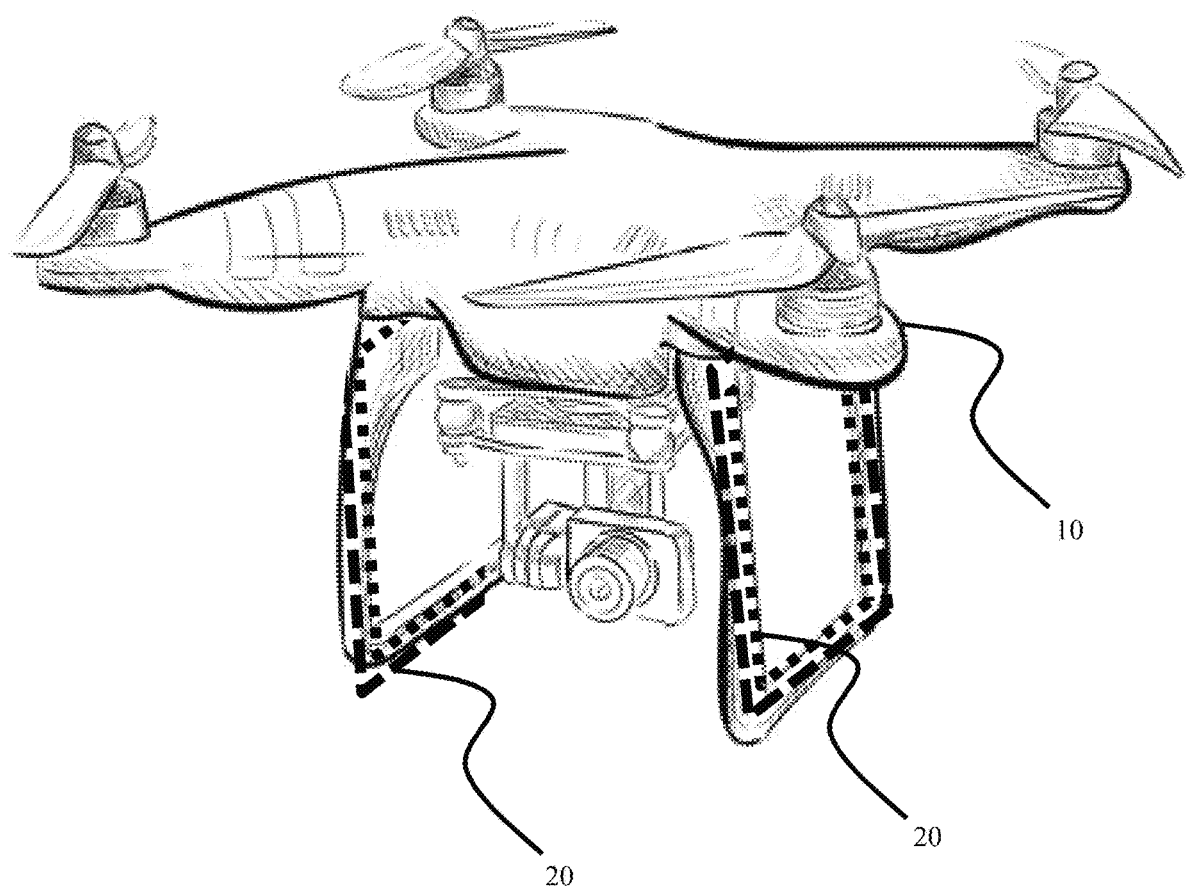
FIG. 1. depicts a drone or an unmanned aerial vehicle (UAV) with conformal wireless power receivers structurally integrated into the fuselage of the UAV.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof and the invention includes all such modifications, such as, but not limited to, the use of this invention to charge robots and vehicles using wireless power transfer.

The present invention comprises a modular charging station configuration operable to enable multi-directional charging of one or more robots or vehicles (e.g., drones, remote controlled, unmanned, autonomous and automatically guided vehicles) having multiple wireless power receivers integrated or attached thereto. Specifically, the present invention comprises a modular charging station configuration operable to enable multi-directional charging of one or more robots and vehicles (e.g., unmanned aerial vehicles (UAVs), unmanned land and water vehicles, remote controlled vehicles).

The present application leverages our previous advancements, specifically including our patent pending invention, USPTO patent application Ser. No. 15/701,112 entitled "Wireless Power Transfer Systems and Components Thereof" (which is herein incorporated by reference in entirety) to enhance the wireless charging capabilities for robots and vehicles.

The present invention comprises a multi-directional wireless charging station, configured to deliver wireless power to remote controlled and autonomous unmanned vehicles and robots, composed of 1) one or more charging pods, wherein each pod has at least two panels, each panel having a first surface facing, at least in part, one or more of an opening and a surface of another panel, and 2) at least two wireless power transmitters (WPTs) affixed to at least two of the panels, wherein the WPTs are configured to wirelessly deliver power to at least two wireless power receivers (WPRs) associated with one of a remote controlled vehicle, an autonomous unmanned vehicle and a robot.

Further, each pod may have a floor and at least three panels, wherein the panels form one or more of a U-shape and a triangular shape and the panels connect to the floor along a bottom side. And furthermore, each pod may have a floor and at least four panels, wherein the panels form one or more of a square, a rectangle, a trapezoidal and a rhombohedral shape and the panels connect to the floor along a bottom side.

The at least two WPTs may each be mounted to or embedded within one of the at least two panels. Moreover, the at least two panels comprise a pod having a shape selected from one of the following group: a square shape, a rectangular shape, a trapezoidal shape, a rhombohedral shape, a triangular shape, and a circular shape.

The at least two WPTs may further comprise strongly coupled asynchronous magnetic resonance WPT systems, having a transmitter coil formed by one of a single-turn and a multi-turn coil, a driver coil formed by one of a single-turn and a multi-turn coil, and the transmitter and driver coils resonate asynchronously and are arranged concentrically, wherein the WPTs are configured to deliver wireless power to at least two WPRs at a distance via asynchronous strong magnetic coupling between the WPTs and WPRs, and wherein the WPRs further comprise strongly coupled asynchronous magnetic resonance WPR systems, having a receiver coil formed by one of a single-turn and a multi-turn coil, a load coil formed by one of a single-turn and a multi-turn coil, and the receiver and load coils resonate asynchronously and are arranged concentrically.

Further, at least one of the transmitter, driver, receiver, and load coils may comprise a capacitor-loaded multi-turn spiral coil. And, each capacitor-loaded multi-turn spiral coil has a width of approximately 3 mm and a separation distance of approximately 1 mm. And also, a distance between the each of at least two WPRs and a corresponding one of the at least two WPTs is in a range of approximately 2 cm to approximately 1 m.

Furthermore, the at least two receivers may each have a diameter in a range of approximately 5 cm to 20 cm. And, the at least two panels may comprise a flexible planar surface, a flexible curved surface, a flexible doubly curved surface, and combinations thereof and the at least two panels may also comprise a plastic material, a fiber glass material, a composite material, and combinations thereof.

Moreover, the at least two WPTs may further comprise at least two wireless transmitters located on one or more of the at least two panels, wherein the at least two WPTs comprise one or more light sources configured to transmit wireless power to the at least two WPRs over a distance; and the at least two WPRs may comprise a photo-detector, configured to receive emitted light from the one or more light sources, and a power converter, configured to convert, the light received from the one or more light sources into an electrical current to charge or power one of a remote controlled vehicle, an autonomous unmanned vehicle and a robot.

Even further still, the at least two WPTs may further comprise at least two wireless transmitters located on one or more of the at least two panels, wherein the at least two wireless transmitters comprise a plurality of adaptively-phased microwave array emitters configured to transmit wireless power to the WPRs over a distance, and the at least two WPRs may each comprise an antenna, configured to receive the wireless power from the WPTs, and a power converter, configured to convert the wireless power received from the plurality of adaptively-phased microwave array emitters into an electrical current to charge or power one of a vehicle and a robot.

And, the robot or vehicle may be temporarily situated in, on, or in proximity to the multi-directional wireless charging station during recharge.

The present invention further comprises a method to charge a robot or vehicle at a distance from a wireless power transmitter (WPT), the method comprising: 1) detecting, on the robot or vehicle, one of a first wireless power receiver (WPR) located a first distance from a first WPT and a second WPR located a second distance from a second WPT, and 2) transmitting power from the WPTs to the WPRs to charge the robot or vehicle.

The method of the present invention may further comprise implementing an auto-tuning process to increase a power transfer efficiency between the WPT and the WPR. The method of the present invention may also further comprise determining and implementing an optimal tuning frequency to achieve maximal power transmission efficiency in response to detecting a distance between a WPT and a WPR. The method of the present invention may also comprise moving or rotating the WPT to align the WPR with the WPT to achieve a maximal power transmission efficiency.

Some of the salient features of the innovation are 1) simultaneous charging on all sides of a robot or other vehicle, utilizing multiple transmitters and receivers to reduce charging time, 2) receivers for planar, singly and doubly curved fuselage of the receiver device (vehicle, robots, etc), saving on precious real estate, 3) reduction in weight of the receiver unit using structural integration, 4) reduction in aero dynamic drag in the case of air vehicles, improving mission time/capability, 5) long distance near-field and far-field charging, and 6) high power charging using arrays of transmitters.

For example, the innovative wireless power charging system can be configured to retrofit as an applique or structurally integrate with the fuselage of the electric vehicles such as drones, cars, motor bikes, and industrial robots. FIG. 1 shows possible structurally integrated conformal mounting of wireless charger receivers on an unmanned aerial vehicle (e.g., a commercial drone or a military).

The components that make up the innovation are the wireless transmitter, the receiver operating at KHz, MHz, GHz and/or higher frequencies, a power driver for the transmitter and an AC-to-DC power converter at the receiver unit, such as a rectifier to charge the battery.

For simultaneous charging of multiple drones, a pod-based matrix design is proposed with the following diagrams showing the 4 walled main pod and configurations for different add-on pods depending on the desired final shape of the charging station pod matrix:

The instant a drone is nearby, the transmitter circuit induces a resonating magnetic field between the transmitter coil and the receiver coil, electricity is transferred through the air from transmitter to receiver, and the drone's battery is charged.

Smart battery technology recognizes when the drone reaches full charge and idles the system to conserve energy.

The present invention is useful in many sectors, including without limitation:

Electric vehicles
Autonomous land, air, and sea vehicles
Non-autonomous (remote controlled or remote piloted) land, air, and sea vehicles
Commercial and military air vehicles, drones, micro air vehicles
Cars, minivans, SUVs, trucks, and similar vehicles
Motor bikes
Industrial robots
Domestic robots
Humanoid and non-humanoid robots
Sensors and Devices related to the Industrial Internet of Things.

The advantages of the current innovation are manifold:

1) Reduction in Charging Time: The current innovation enables charging a receiver device from all sides simultaneously and thereby reduce charging time. The charging time is also reduced by using near field and far field beam forming techniques described in Advantage 6.

2) Saves Real Estate on the application Device: The wireless receiver is configured to be placed or structurally integrated with the fuselage of the receiver device which allows for utilizing the otherwise unused space. The fuselage is mostly made of plastic, fiber glass and/or composite material.

3) Reduction in Weight: Structural integration of the receiver coils with these materials enables reduction in weight of the wireless charger in comparison to a stand-alone receiver, as additional substrate or supporting material is not required for the receiver. Especially, in the case of drones, reducing the weight has significant advantages as every ounce of weight has adverse impact on the mission time.

4) Improves Mission Time: Structurally integrated chargers reduce the overall drone weight and thereby improve mission time.

5) Reduction in aerodynamic Drag: Structurally integrated chargers reduce the aerodynamic drag and improve mission time, as well as save fuel. Drone external geometry and surface are designed to take advantage of the air pressure. A stand-alone external charger would compromise the aerodynamic capability air vehicle.

6) Improves Mission Capability: In the case of drones, state of the art wireless charger receiver components are mounted at the bottom of the drone, which limits or prevents the bottom parts of the drone to be used for any other functioning. Since cameras are usually fitted at the bottom for imaging and direction finding, keeping a wireless receiver at the bottom could limit functioning of the camera. Our innovation improves the mission capability as the wireless charging is carried out on the sides of the drones and such electric vehicles.

7) Long Distance Charging: Due to efficient transmitter and receiver designs described in the attached manuscript, by using large transmitters and receivers, the receiver is charged more efficiently. Reported efficiency is higher than existing devices.

8) Long Distance Charging using Near Field or Far Field Beam Forming: By using an array of transmitters, a narrow beam of radiation is created which produces a focused energy at the receivers. Note that such charging method could be achieved with near field magnetic resonance coils or far field AC (KHz, VHF, UHF to GHz) power transmission.

9) High Power Charging using Array of Transmitters: Using such beams, high is power is transferred in a short time.

FIG. 1 depicts a drone or an unmanned aerial vehicle (UAV) with conformal wireless power receivers 20 structurally integrated into the fuselage of the UAV 10.

Figure 2A:
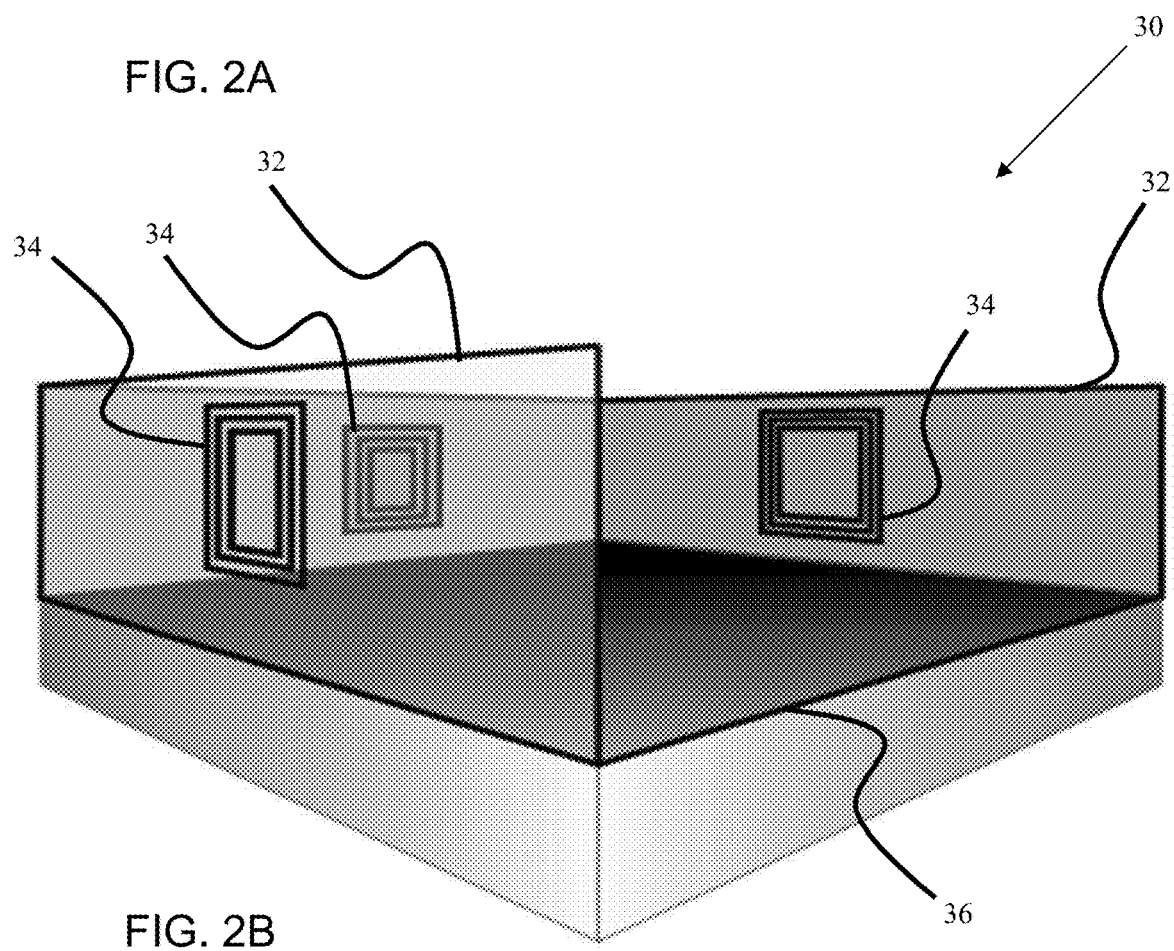
FIG. 2. depicts a charging station pod with wireless power transmitters (WPTs) connected to the pod walls or panels. 2A depicts a pod with three walls or panels and 2 B depicts a pod with two walls or panels.
Figure 2B:
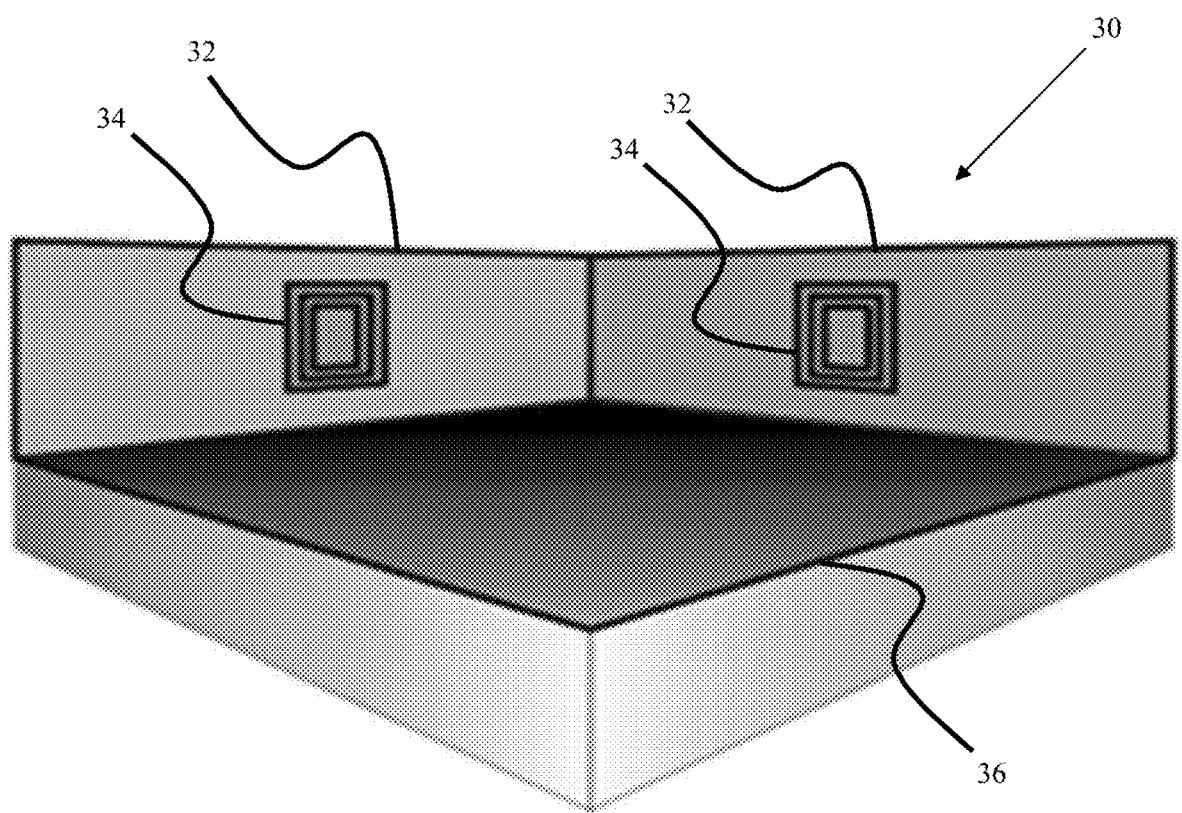

FIG. 2 depicts a charging station pod 30 with wireless power transmitters (WPTs) 34 connected to the pod walls or panels 32, which are also in contact with a pod floor 36. FIG. 2A depicts a pod 30 with three walls or panels 32 and FIG. 2B depicts a pod 30 with two walls or panels 32.

Figure 3A:
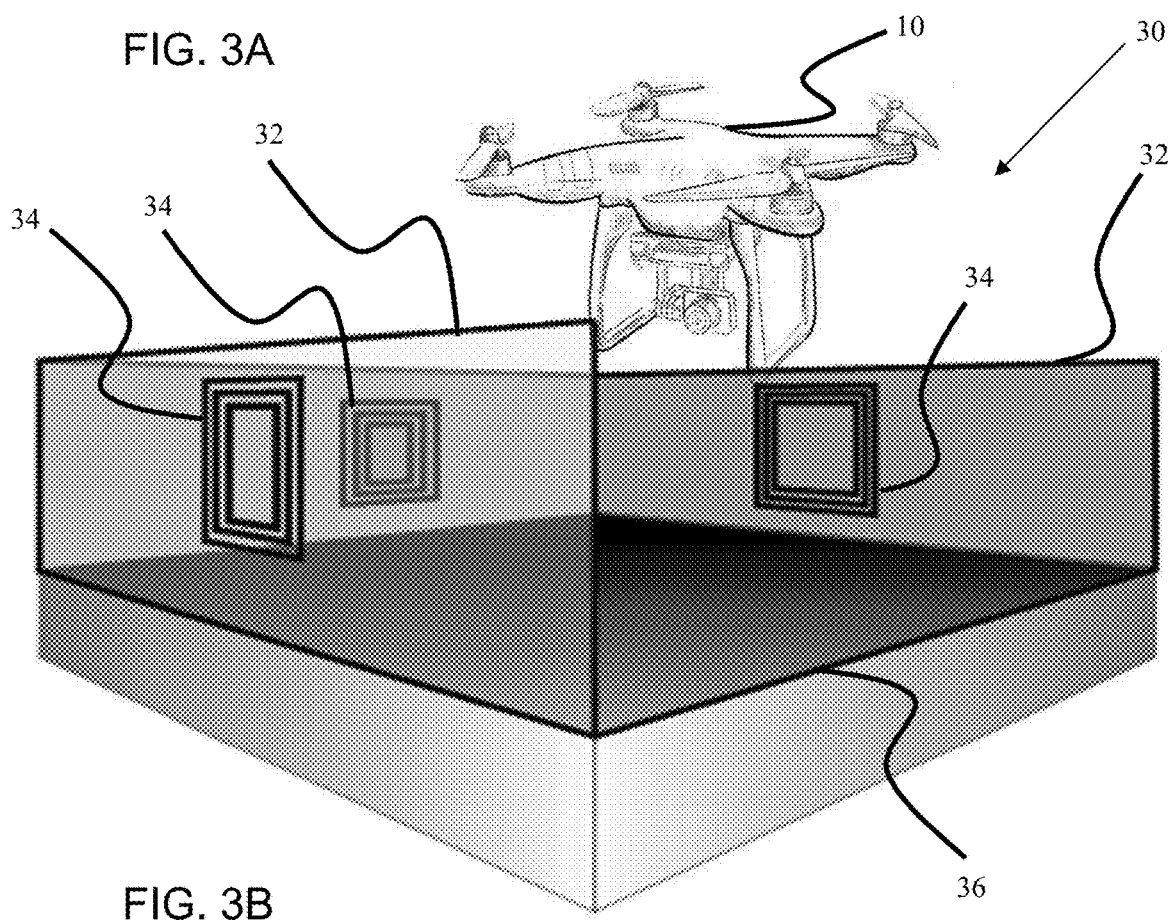
FIG. 3. depicts a charging station pod with wireless power transmitters (WPTs) connected to the pod walls or panels. 3A depicts a drone or UAV coming in for a landing in a pod with three walls or panels and 3B depicts a drone or UAV landed within a pod having four walls or panels.
Figure 3B:
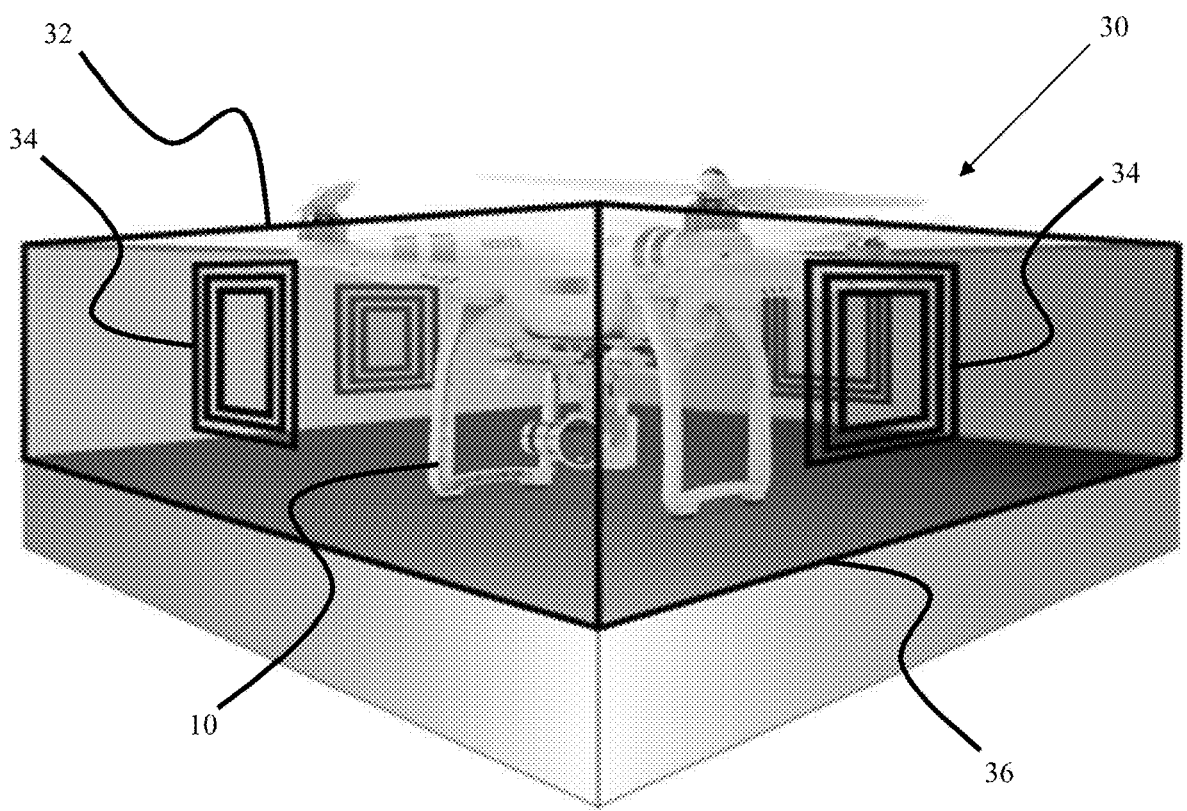

FIG. 3 depicts a charging station pod 30 with WPTs 34 connected to the pod walls or panels 32, which are also in contact with a pod floor 36. FIG. 3A depicts a drone or UAV 10 coming in for a landing in a pod with three walls or panels 32 and FIG. 3B depicts a drone or UAV 10 landed within a pod having four walls or panels 32. The drone or UAV could just as easily be any of the systems described herein (robots, vehicles, etc.)

Figure 4A:
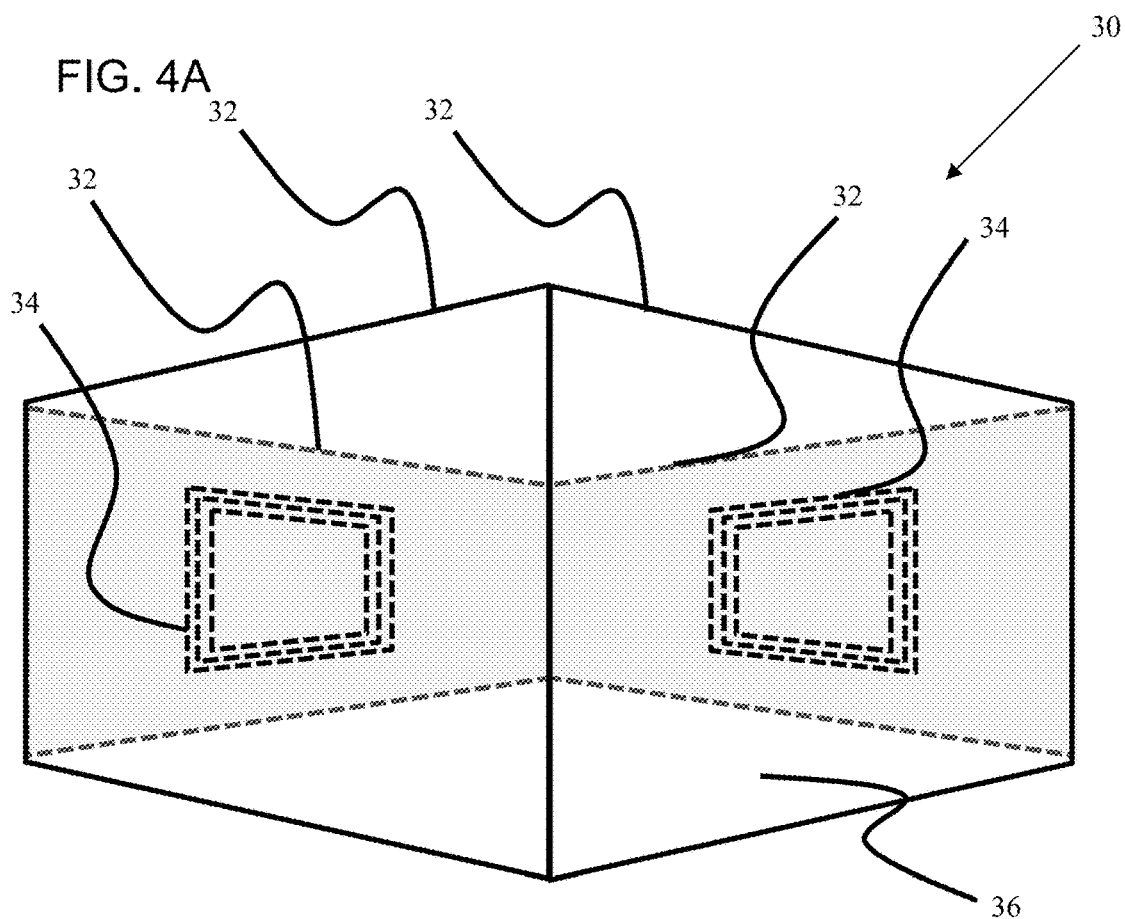
FIG. 4. depicts a pod with four walls or panels, having WPTs connected to two of the walls or panels. 4A shows the WPTs connected to the back walls or panels and 4B shows the WPTs connected to the front walls or panels.
Figure 4B:
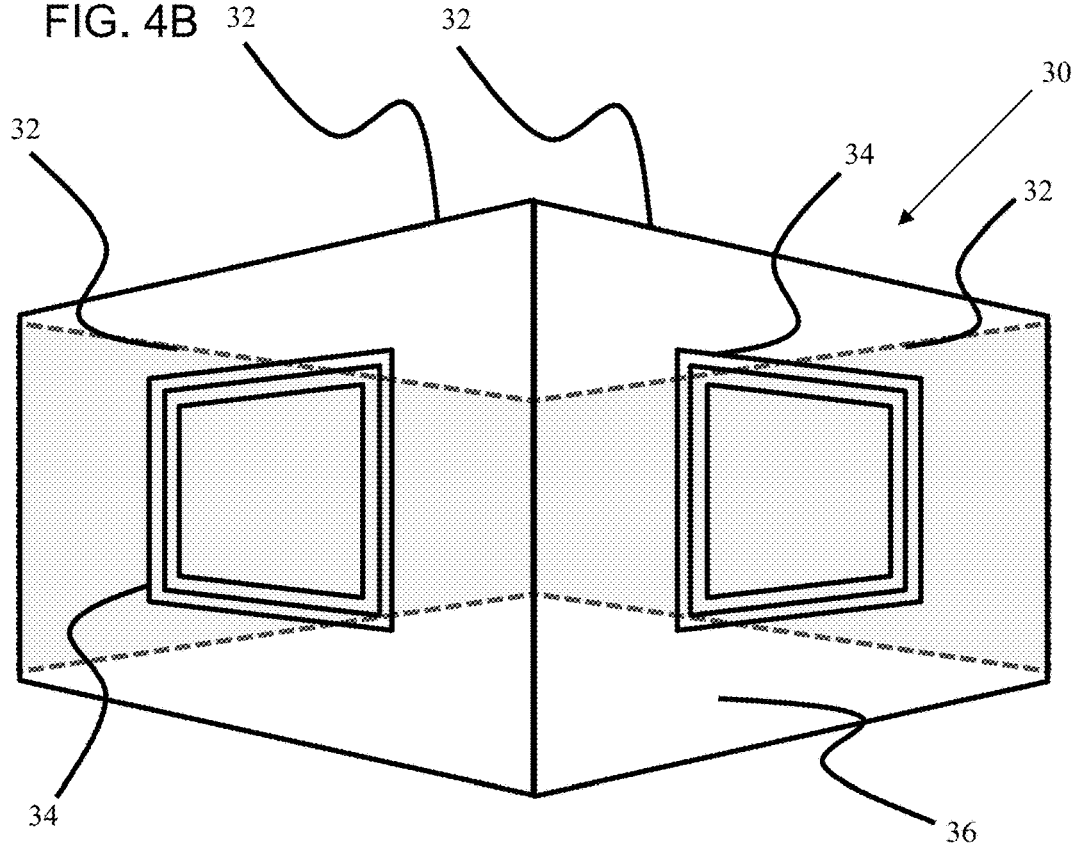

FIG. 4 depicts a pod 30 with four walls or panels 32, having WPTs 34 connected to two of the walls or panels 32, which are also in contact with a pod floor 36. FIG. 4A shows the WPTs 34 connected to the back walls or panels 32 and FIG. 4B shows the WPTs 34 connected to the front walls or panels 32.

Figure 5:
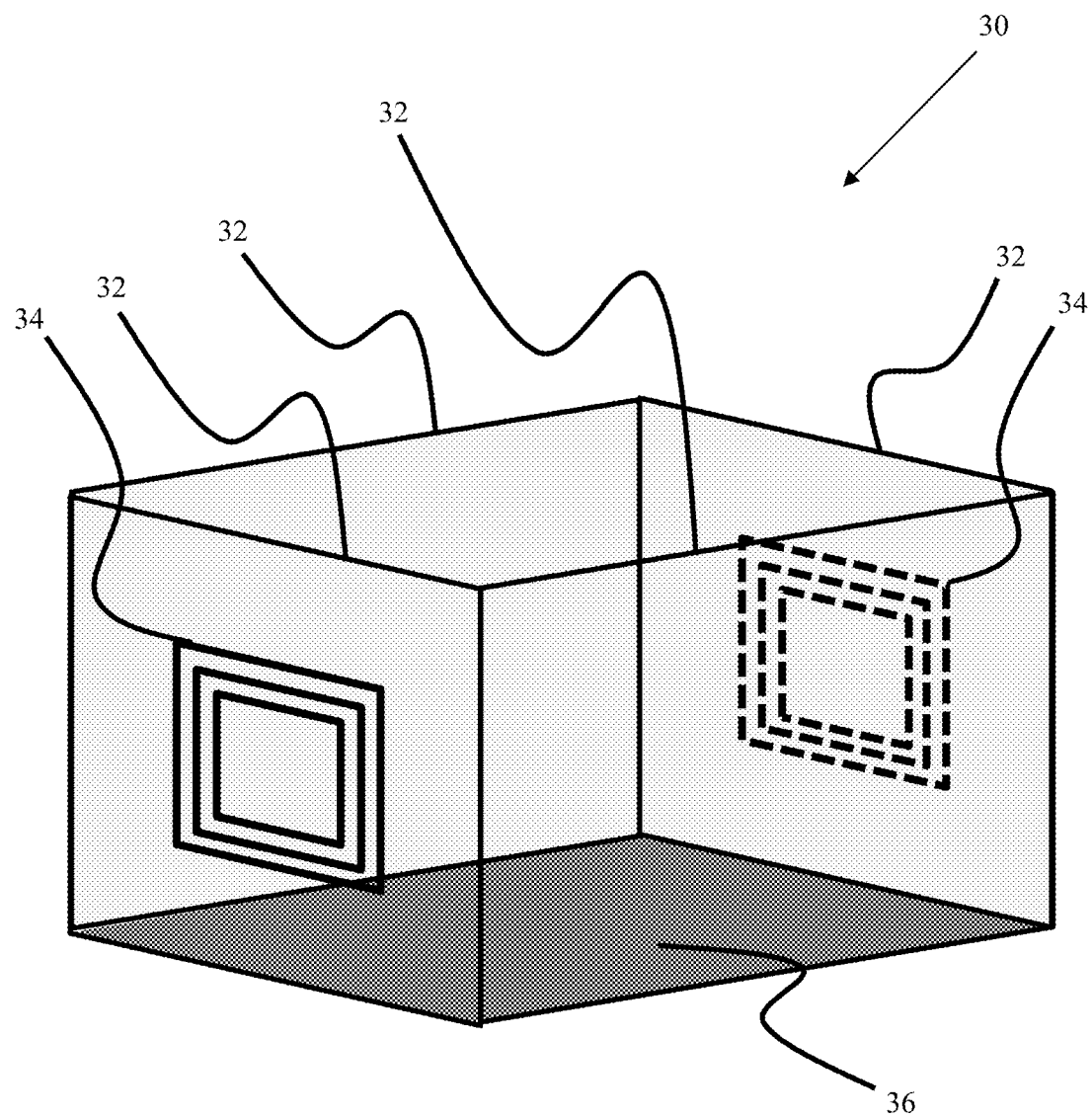
FIG. 5. depicts a pod with four walls or panels, having WPTs connected to two of the side walls or panels.

FIG. 5 depicts a pod 30 with four walls or panels 32, having WPTs 34 connected to two of the side walls or panels 32, which are also in contact with a pod floor 36.

Figure 6:
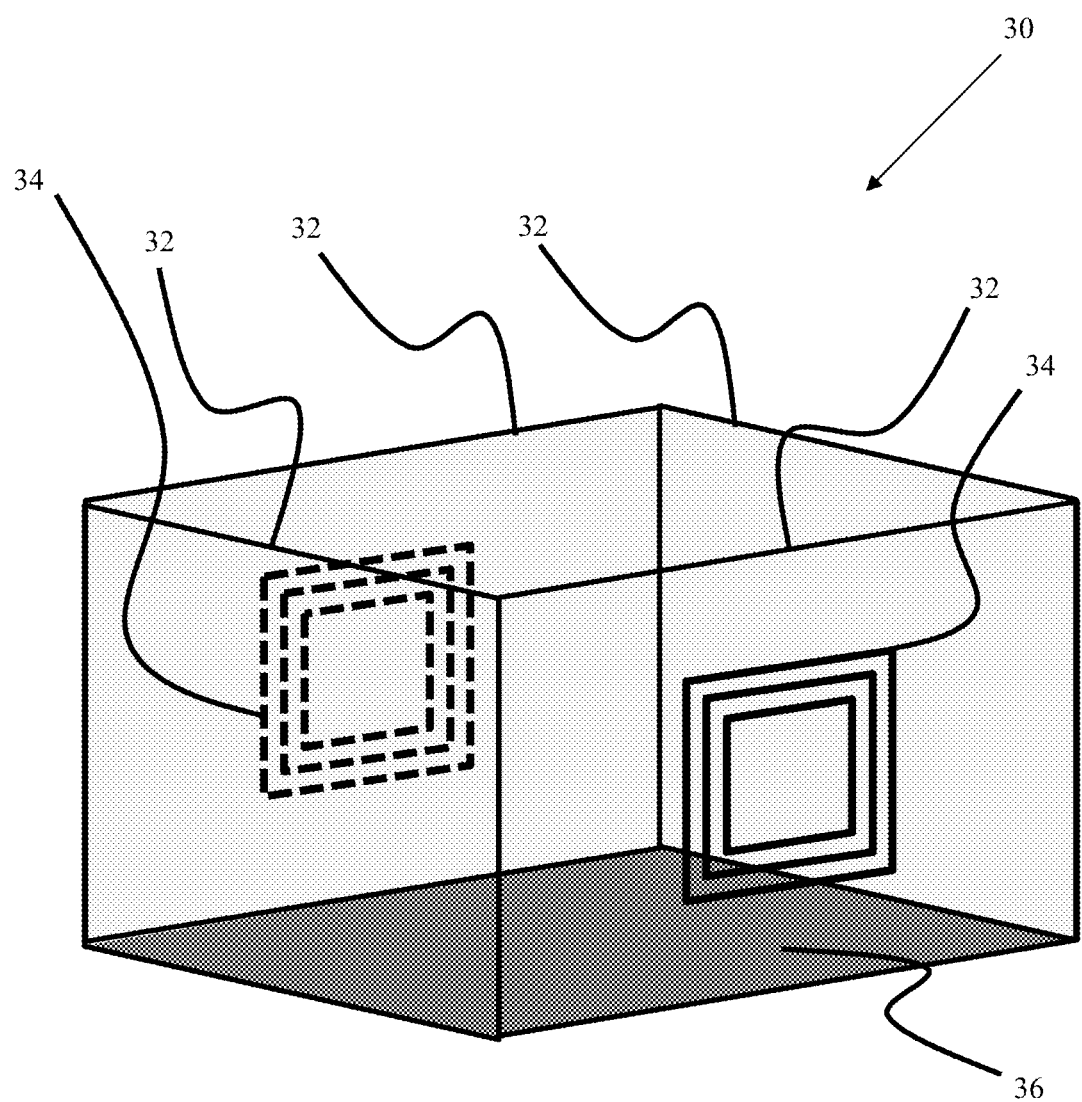
FIG. 6. depicts a pod with four walls or panels, having WPTs connected to two walls or panels, the front and back walls/panels.

FIG. 6 depicts a pod 30 with four walls or panels 32, which are also in contact with a pod floor 36, having WPTs 34 connected to two walls or panels 32, the front and back walls/panels.

Figure 7:
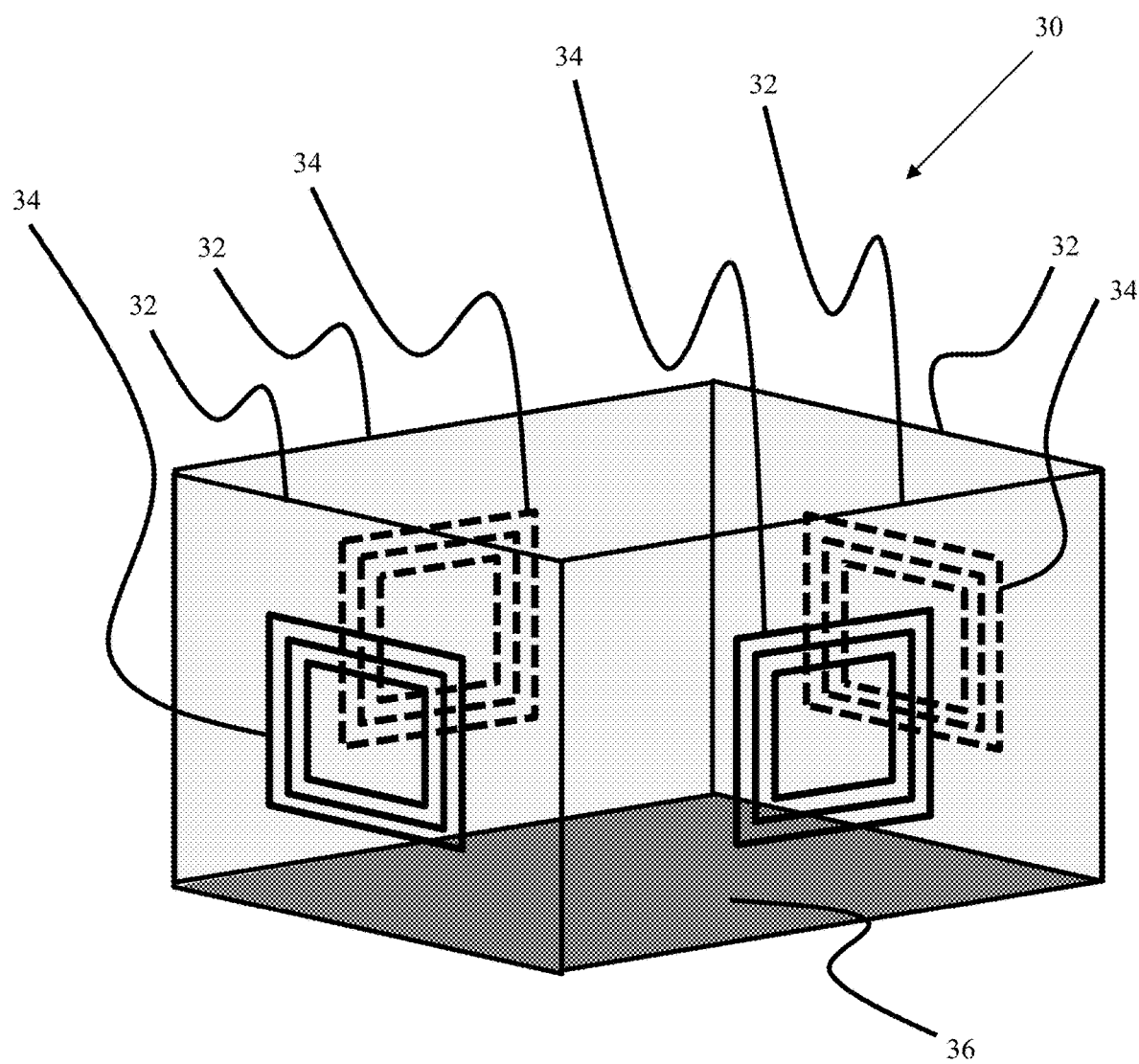
FIG. 7. depicts a pod with four walls or panels, having WPTs connected to four walls or panels, the two side walls/panels as well as the front and back walls/panels.

FIG. 7 depicts a pod 30 with four walls or panels 32, which are also in contact with a pod floor 36, having WPTs 34 connected to four walls or panels 32, the two side walls/panels as well as the front and back walls/panels.

Figure 8:
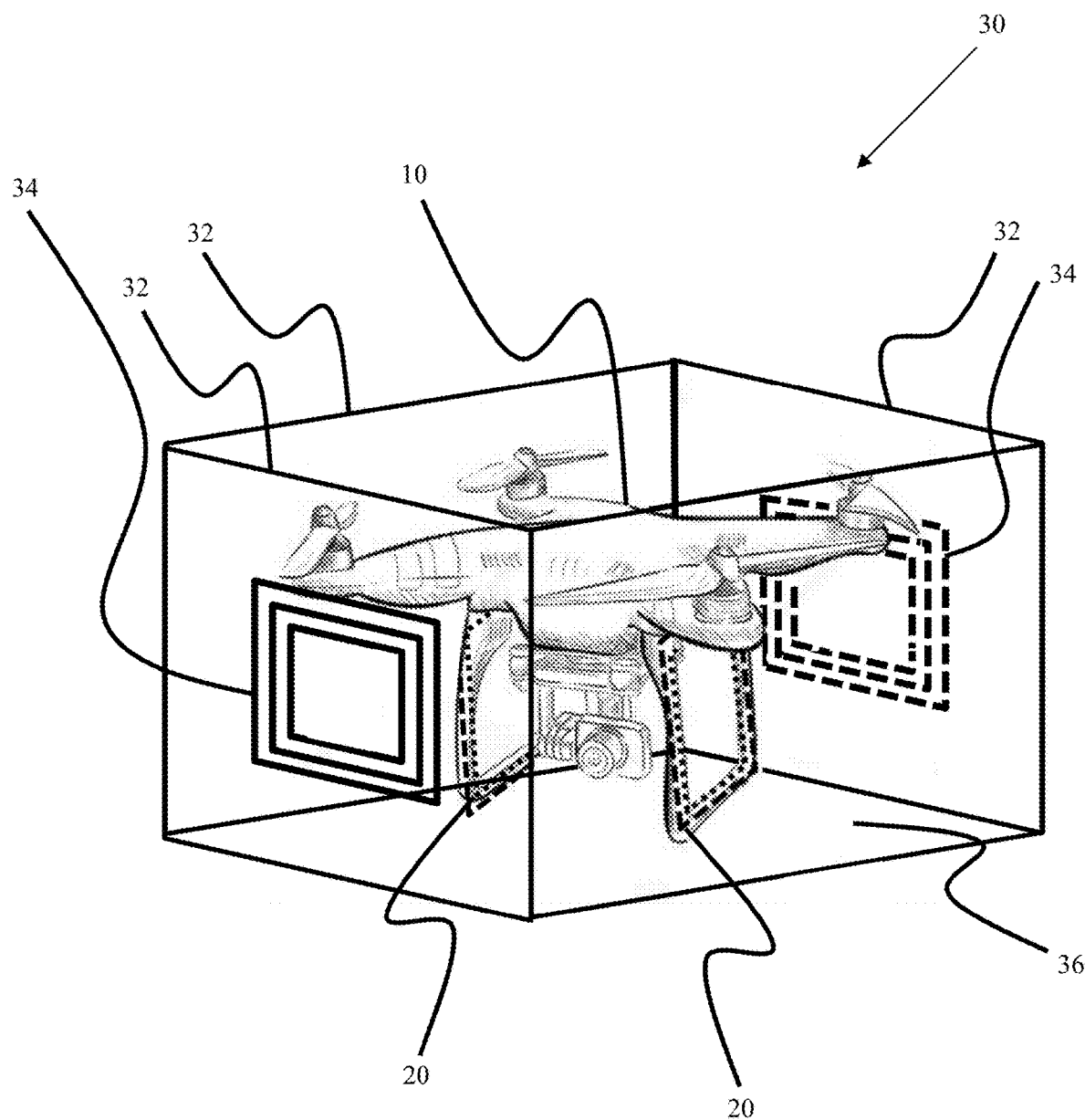
FIG. 8. depicts a drone or UAV landed within a pod having four walls or panels, with WPTs connected to the two side walls/panels.

FIG. 8 depicts a drone or UAV 10 landed within a pod 30 having four walls or panels 32, which are also in contact with a pod floor 36, with WPTs 34 connected to the two side walls/panels 32.

Figure 9:
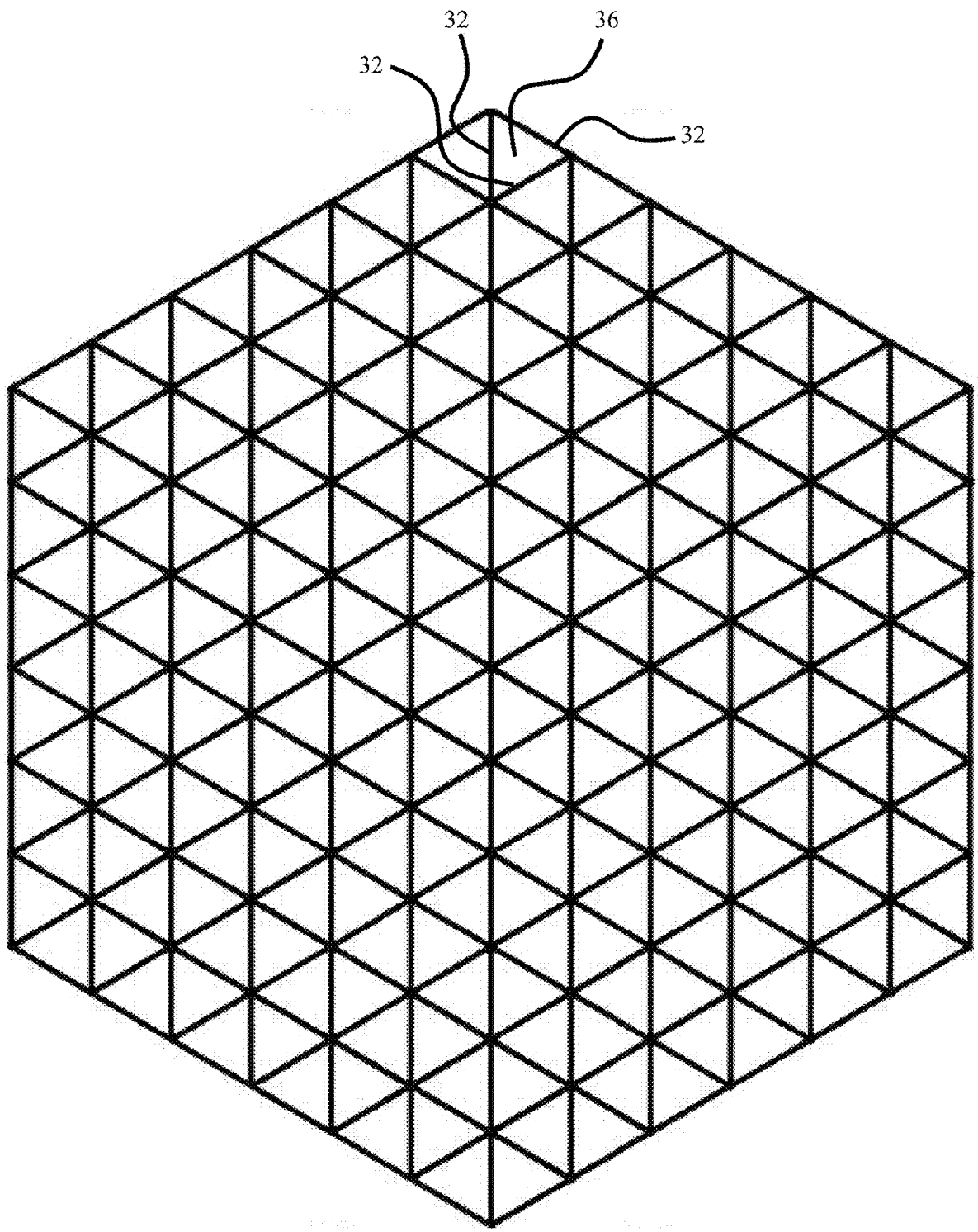
FIG. 9. depicts a top down view of a two-dimensional, single level triangular pod array, with each pod having three walls or panels.

FIG. 9 depicts a top down view of a two-dimensional, single level triangular pod array, with each pod 30 having three walls or panels 32, a floor 36 and a top opening to the outside.

Figure 10:
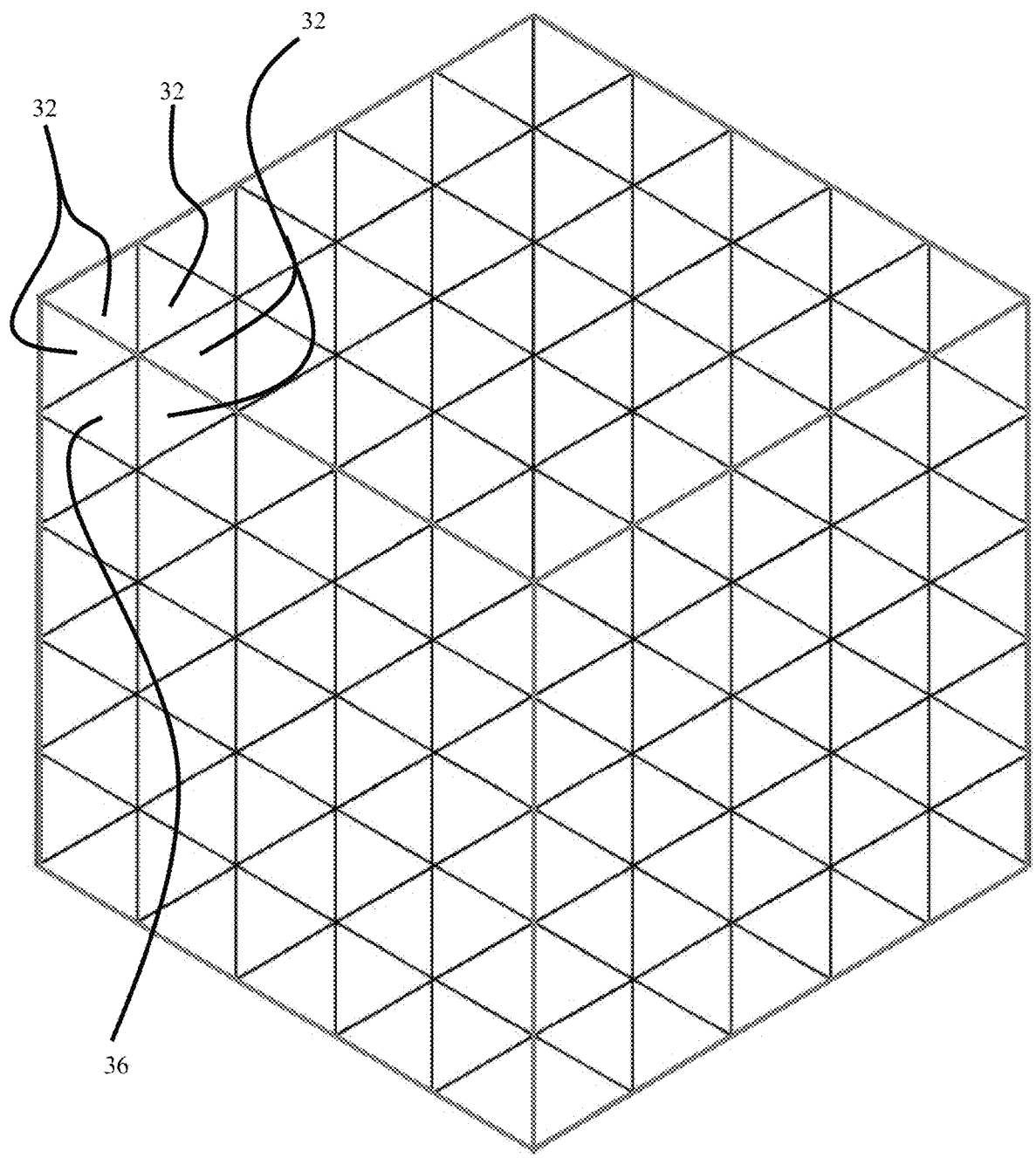
FIG. 10. depicts a side perspective view of a three-dimensional, multi-level cubic pod array, with each pod having three walls or panels and an opening to the outside.

FIG. 10 depicts a side perspective view of a three-dimensional, multi-level cubic pod array, with each pod 30 having three walls or panels 32, a floor 36 and an opening (top or side) to the outside.

Figure 11:
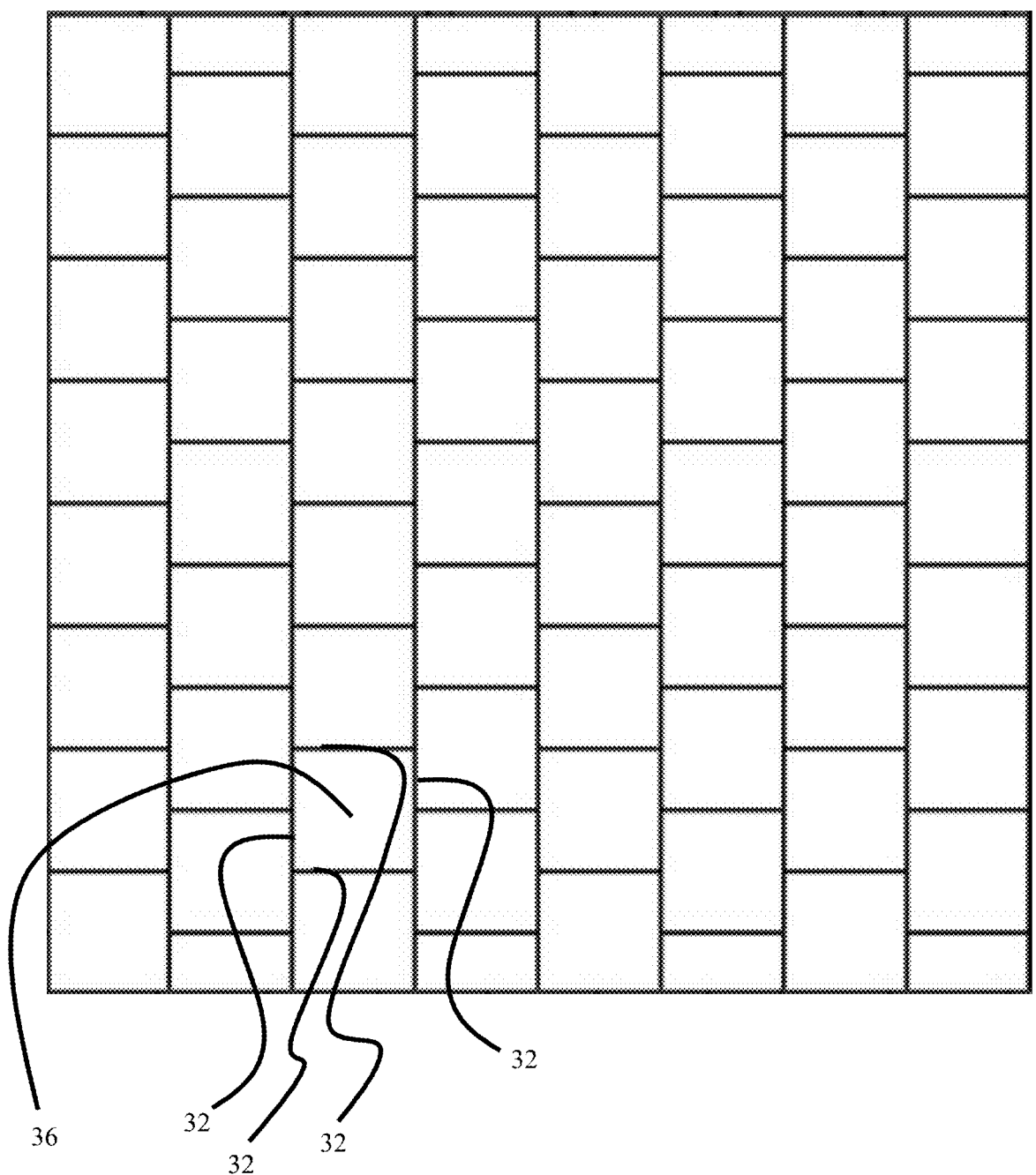
FIG. 11. depicts a top down view of a two-dimensional, single level offset-square pod array, with each pod having two or more walls/panels.

FIG. 11 depicts a top down view of a two-dimensional, single level offset-square pod array, with each pod 30 having two or more walls/panels 32, a floor 36 and a top opening to the outside.

Figure 12:
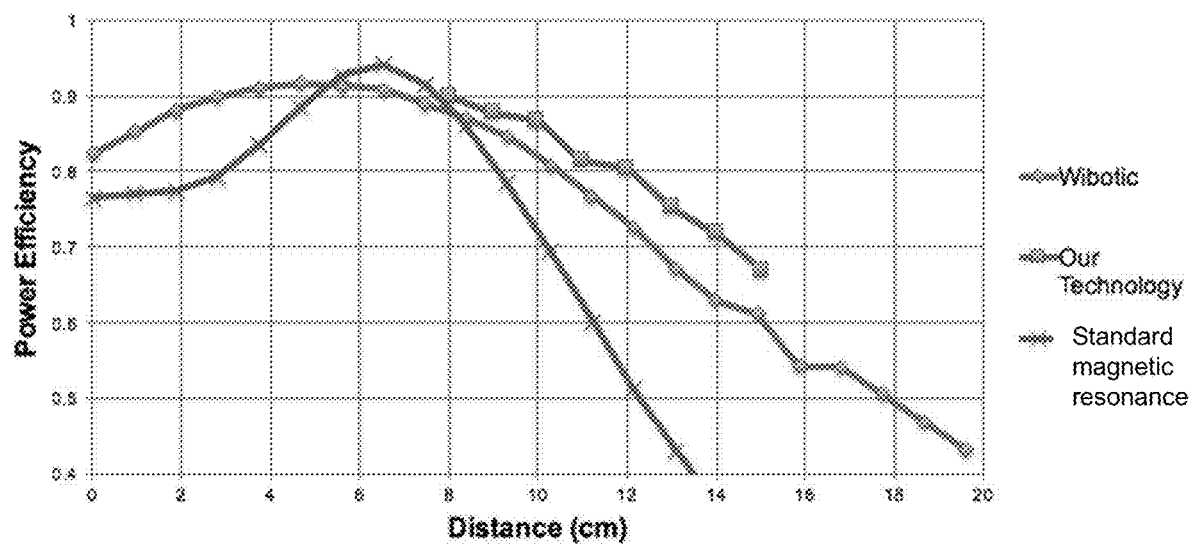
FIG. 12. depicts a graph showing an efficiency comparison to competitor technologies, including standard magnetic resonance as well as the Wibotic drone charging pad.

FIG. 12 depicts a graph showing an efficiency comparison to competitor technologies, including standard magnetic resonance as well as the Wibotic drone charging pad.

It should be understood that, although specific embodiments have just been described, the claimed subject matter is not intended to be limited in scope to any particular embodiment or implementation. For purposes of explanation, specific numbers, systems, or configurations may have been set forth to provide a thorough understanding of claimed subject matter. However, it should be apparent to one skilled in the art having the benefit of this disclosure that claimed subject matter may be practiced without those specific details. In other instances, features that would be understood by one of ordinary skill were omitted or simplified so as not to obscure claimed subject matter.

While certain features have been illustrated or described herein, many modifications, substitutions, changes, or equivalents may not occur to those skilled in the art. It is, therefore, to be understood that the appended claims are intended to cover all such modifications or changes as fall within the true spirit of the claimed subject matter.

What is claimed is:

1. A multi-directional wireless charging station, configured to deliver wireless power to remote controlled and autonomous unmanned vehicles and robots, comprising:
   one or more charging pods, wherein each pod includes:
      at least two panels, each panel having a first surface facing, at least in part, one or more of an opening and a surface of another panel, and
      a floor, the at least two panels connect to the floor along a bottom edge of the panels; and
   at least two wireless power transmitters (WPTs) affixed to at least two of the panels, wherein the WPTs are configured to wirelessly deliver power to at least two wireless power receivers (WPRs) associated with one of a remote-controlled vehicle, an autonomous unmanned vehicle and a robot.

2. The multi-directional wireless charging station of claim 1, wherein adjacent panels do not contact each other.

3. The multi-directional wireless charging station of claim 1, wherein adjacent panels are connected to each other along a portion of mutual contact.

4. The multi-directional wireless charging station of claim 1, wherein each pod has at least three panels, wherein the panels form one or more of a U-shape and a triangular shape.

5. The multi-directional wireless charging station of claim 1, wherein each pod has a floor and at least four panels, wherein the panels form one or more of a square, a rectangle, a trapezoidal and a rhombohedral shape and the panels connect to the floor along a bottom edge of the panels.

6. The multi-directional wireless charging station of claim 1, wherein the at least two WPTs are each mounted to or embedded within one of the at least two panels.

7. The multi-directional wireless charging station of claim 1, wherein: the at least two panels comprise a pod having a shape selected from one of the following group: a square shape, a rectangular shape, a trapezoidal shape, a rhombohedral shape, a triangular shape, and a circular shape.

8. The multi-directional wireless charging station of claim 1, wherein the at least two WPTs further comprise strongly coupled asynchronous magnetic resonance WPT systems, having a transmitter coil formed by one of a single-turn and a multi-turn coil, a driver coil formed by one of a single-turn and a multi-turn coil, and the transmitter and driver coils resonate asynchronously and are arranged concentrically, wherein the WPTs are configured to deliver wireless power to at least two WPRs at a distance via asynchronous strong magnetic coupling between the WPTs and WPRs, and wherein the WPRs further comprise strongly coupled asynchronous magnetic resonance WPR systems, having a receiver coil formed by one of a single-turn and a multi-turn coil, a load coil formed by one of a single-turn and a multi-turn coil, and the receiver and load coils resonate asynchronously and are arranged concentrically.

9. The multi-directional wireless charging station of claim 8, wherein at least one of the transmitter, driver, receiver, and load coils comprise a capacitor-loaded multiturn spiral coil.

10. The multi-directional wireless charging station of claim 9, wherein each capacitor-loaded multiturn spiral coil has a width of approximately 3 mm and a separation distance of approximately 1 mm.

11. The multi-directional wireless charging station of claim 8, wherein a distance between the each of at least two WPRs and a corresponding one of the at least two WPTs is in a range of approximately 2 cm to approximately 1 m.

12. The multi-directional wireless charging station of claim 1, wherein the at least two receivers each have a diameter in a range of approximately 5 cm to 20 cm.

13. The multi-directional wireless charging station of claim 1, wherein the at least two panels comprise:
a flexible planar surface, a flexible curved surface, a flexible doubly curved surface, and combinations thereof, made from a plastic material, a fiber glass material, a composite material, and combinations thereof.

14. The multi-directional wireless charging station of claim 1, wherein the at least two WPTs further comprise:
at least two wireless transmitters located on one or more of the at least two panels, wherein the at least two WPTs comprise one or more light sources configured to transmit wireless power to the at least two WPRs over a distance; and
the at least two WPRs comprise:
a photo-detector configured to receive emitted light from the one or more light sources; and a power converter configured to convert, the light received from the one or more light sources into an electrical current to charge or power one of a remote controlled vehicle, an autonomous unmanned vehicle and a robot.

15. The multi-directional wireless charging station of claim 1, wherein the at least two WPTs further comprise:
at least two wireless transmitters located on one or more of the at least two panels, wherein the at least two wireless transmitters comprise a plurality of adaptively-phased microwave array emitters configured to transmit wireless power to the WPRs over a distance; and
the at least two WPRs each comprise:
an antenna configured to receive the wireless power from the WPTs; and
a power converter configured to convert the wireless power received from the plurality of adaptively-phased microwave array emitters into an electrical current to charge or power one of a vehicle and a robot.

16. The multi-directional wireless charging station of claim 1, wherein the robot or vehicle is temporarily situated in, on, or in proximity to the multi-directional wireless charging station during recharge.

17. A method to charge a robot or vehicle at a distance from a wireless power transmitter (WPT), the method comprising:
detecting, on the robot or vehicle, one of a first wireless power receiver (WPR) located a first distance from a first WPT and a second WPR located a second distance from a second WPT; and
transmitting power from the WPTs to the WPRs to charge the robot or vehicle.

18. The method of claim 17, further comprising:
implementing an auto-tuning process to increase a power transfer efficiency between the WPT and the WPR.

19. The method of claim 18, further comprising:
in response to detecting a distance between a WPT and an WPR determining and implementing an optimal tuning frequency to achieve maximal power transmission efficiency.

20. The method of claim 17, further comprising:
moving or rotating the WPT to align the WPR with the WPT to achieve a maximal power transmission efficiency.

* * * * *